(12) United States Patent
von Behren et al.

(10) Patent No.: US 7,302,568 B2
(45) Date of Patent: Nov. 27, 2007

(54) METHOD, SYSTEM, AND ARTICLE OF MANUFACTURE FOR REMOTE MANAGEMENT OF DEVICES

(75) Inventors: Paul D. von Behren, Boulder, CO (US); John Forte, Redwood City, CA (US); Waikwan Hui, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 761 days.

(21) Appl. No.: 10/388,670

(22) Filed: Mar. 14, 2003

(65) Prior Publication Data

US 2004/0179683 A1 Sep. 16, 2004

(51) Int. Cl.
*H04L 29/00* (2006.01)

(52) U.S. Cl. ...................................................... 713/167

(58) Field of Classification Search ................. 713/164
See application file for complete search history.

(56) References Cited

U.S. PATENT DOCUMENTS

| | | | | |
|---|---|---|---|---|
| 6,363,421 | B2 * | 3/2002 | Barker et al. ............... | 709/223 |
| 6,480,957 | B1 * | 11/2002 | Liao et al. .................. | 713/170 |
| 6,687,897 | B2 * | 2/2004 | Guinart ...................... | 717/143 |
| 7,096,355 | B1 * | 8/2006 | Marvit et al. ............... | 713/162 |
| 2002/0166048 | A1 * | 11/2002 | Coulier ....................... | 713/169 |

\* cited by examiner

*Primary Examiner*—Kambiz Zand
*Assistant Examiner*—Andrew L Nalven
(74) *Attorney, Agent, or Firm*—Martine Penilla & Gencarella LLP (57) ABSTRACT

Provided are a method, system, and article of manufacture. A first process creates a second process. A cipher is generated. The first process is terminated. Access is controlled to the generated cipher.

10 Claims, 8 Drawing Sheets

FIG. 9

METHOD, SYSTEM, AND ARTICLE OF MANUFACTURE FOR REMOTE MANAGEMENT OF DEVICES

BACKGROUND OF THE INVENTION

1. Field of the Invention

The present invention relates to a method, system, and an article of manufacture for remote management of devices.

2. Description of the Related Art

A client may administer remote devices, such as, storage devices, over a network. The management of the remote devices may require the client to execute a sequence of commands at the remote device. The sequence of commands to execute at the remote device may be stored in a script at the client. The client sends commands from the script to the remote device for execution. The commands are executed at the remote device and responses are sent to the client. The executed commands may perform configurations of the remote devices.

A scripting client is a software component installed on the client that is used to forward the commands in the script for processing on the remote device. A network login interface may be used by the scripting client to login to the remote device prior to executing the commands in the remote device. Repeated logins may have to be performed by a user to execute a plurality of commands at the remote device. The network login interface may use protocols, such as, Telnet, rlogin, FTP, etc. to communicate over the network.

SUMMARY

Provided are a method, system, and article of manufacture. A first process creates a second process. A cipher is generated. The first process is terminated. Access is controlled to the generated cipher.

In certain implementations, only processes that are permitted to read the generated cipher are authorized to access the second process.

In further implementations, the cipher is stored subsequent to generating the cipher. Access to the stored cipher is allowed to a third process. A message from the third process to the second process is encrypted with the stored cipher.

In additional implementations, the authorization further comprises receiving a message at the second process from a third process, decrypting the received message with the cipher, and determining if the decrypted message is valid. If the decrypted message is valid, then the third process is allowed to access the second process. If the decrypted message is invalid, then the third process is prevented from accessing the second process.

In further implementations, the second process further performs establishing a network session between a client and a server, sending a command from the client to the server, and receiving a response from the server, based on the execution of the command at the server.

In additional implementations the second process communicates with other processes via an interprocess communication mechanism, wherein the interprocess communication mechanism allows the second process to be accessed by other processes. In yet other implementations, the creation, generation, termination and authorization are performed by an application that sends a series of commands for execution on a remote device, wherein the cipher is generated by the first process or the second process.

The implementations provide a scripting client where a single login is adequate for remote execution of a series of commands on a remote device, where the series of commands are written in any scripting language known in the art. Additionally, the implementations prevent the network session created between the client and the remote device from being accessed by unauthorized processes. The implementations do not require any changes to the remote device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Figure 1:
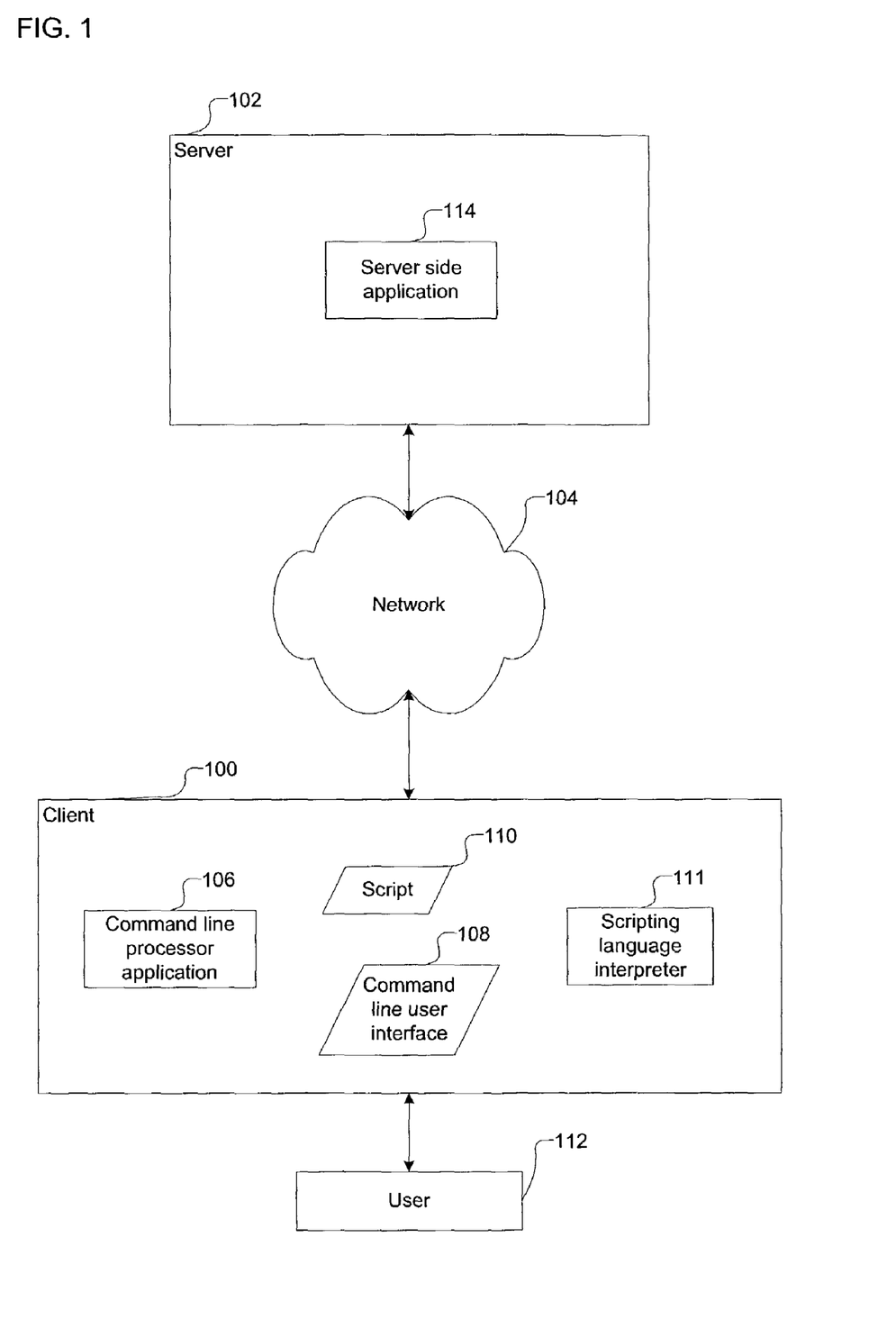
FIG. 1 illustrates a block diagram of a computing environment, in accordance with certain described aspects of the invention.

FIG. 1 illustrates a block diagram of a computing environment, in accordance with certain implementations of the invention. A client 100 and a server 102 are connected to a network 104. The client 100 may comprise any computational device known in the art, such as, a personal computer, a workstation, a server, a mainframe, a hand held computer, a palm top computer, a telephony device, a network appliance, etc. The server 102 may comprise any computational device known in the art, such as, a personal computer, a workstation, a server, a mainframe, a hand held computer, a palm top computer, a telephony device, a network appliance, a storage device, a disk array, etc., that may be administered by the client 100. The network 104 may comprise any network known in the art, such as, the Internet, an intranet, a Local area network (LAN), a Wide area network (WAN), a wireless network, etc. The client 100 may alternatively connect to the server 102 without a network, such as through direct lines, common bus systems, etc., in a manner known in the art. Also the network 104 may be part of one or more larger networks or may be an independent network or may be comprised of multiple interconnected networks. While in the described implementations, the client 100 and the server 102 communicate within a client-server paradigm, with the client 100 acting as a client and the server 102 acting as a server, the client 100 and the server 102 may also communicate within a peer-to-peer or any other paradigm known in the art. Furthermore, in alternative implementations, additional clients may communicate with the server 102 and the client 100 may communicate with more than one server.

The client 100 comprises a command line processor application 106, a command line user interface 108, a script 110, and a scripting language interpreter 111. The command line processor application 106 is an application that can process commands included in the script 110, where the commands included in the script 110 are extracted via an interpretation of the lines of the script by the scripting language interpreter 111. The command line user interface 108 may comprise a user interface program executing in the client 100 in which a user 112 responds to a visual prompt by typing in a command on a specified line, receives a response, and then enters another command, and so forth. The scripting language interpreter 111 is able to interpret the lines of the script 110, where the script may be written in any scripting language known in the art, such as, Perl, Korn shell scripting language, Bourne shell scripting language, etc.

The command line processor application 106 sends each command from the script 110 for remote execution on the server 102. Commands in the script 110 are executed on the server 102 by a server side application 114 and results are returned to the client 100.

Therefore, FIG. 1 shows the command line processor application 106, where the command line processor application 106 sends each command from the script 110 to a remote device, such as, the server 102, for execution.

Figure 2:
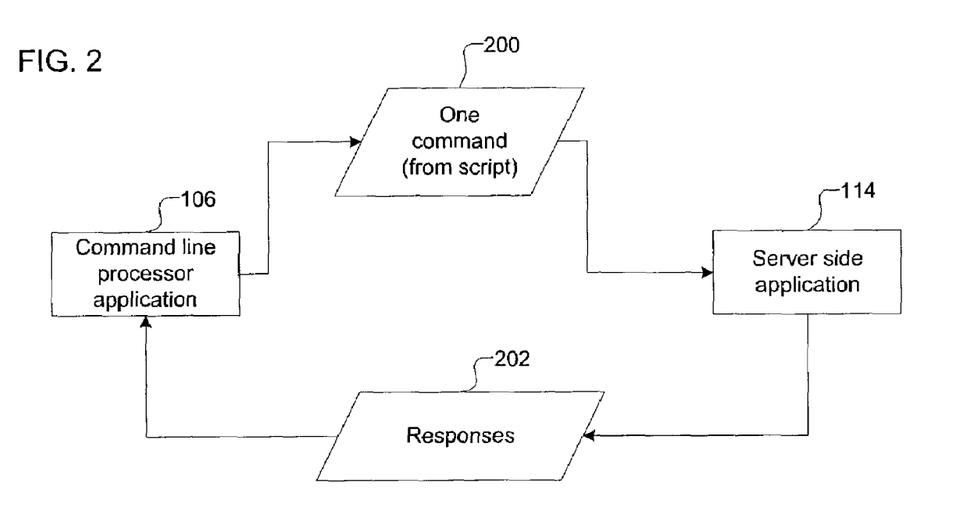
FIG. 2 illustrates a block diagram of the interaction between a command line processor application and a server side application, in accordance with certain described implementations of the invention.

FIG. 2 illustrates a block diagram of the interaction between the command line processor application 106 and the server side application 114, in accordance with certain implementations of the invention. The command line processor application 106 establishes a network session with the server side application 114 and sends one command 200 included in the script 110 to the server side application 114. The server side application 114 receives the command 200 and executes the command 200 on the server 102. Based on the execution of the command 200, the server side application 114 may send responses 202 to the client 100. The responses 202 may be viewed on the command line user interface 108 via the command line processor application 106.

Figure 3:
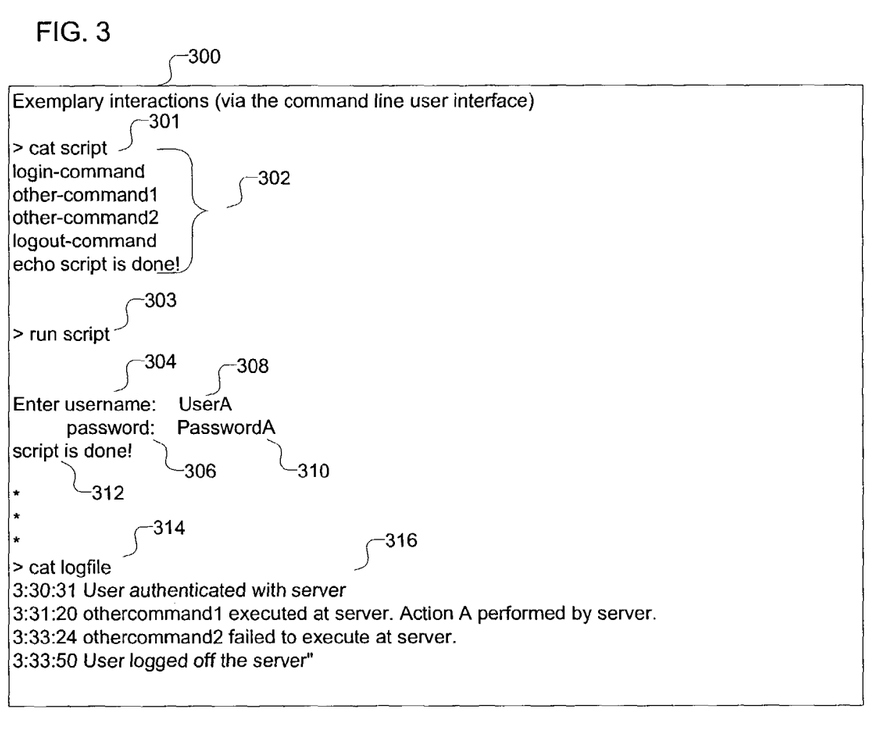
FIG. 3 illustrates exemplary interactions for remote scripting via a command line user interface, in accordance with certain described implementations of the invention.

FIG. 3 illustrates exemplary interactions 300 between the user 112 and the server 102 via the command line user interface 108. The user 112 types "cat script" 301 on the command line user interface 108. The commands included the script 110 are displayed (reference numeral 302) on the command line user interface 108. For example, in one implementation the script 110 may include five commands: login-command; other-command1; other-command2; logout-command; echo script is done. The user 112 types "run script" 303 on the command line user interface 108. The exemplary command "run script" 303 is an instruction to run the commands included in the script 110 on server 102, where the commands included in the script 110 may be sent one by one to the server 102. The command line processor application 106 receives the exemplary command "login-command" which is the first command of the script 110 and responds by asking the user 112 for a username 304 and a password 306. The user 112 enters "UserA" 308 as the username 304 and enters "PasswordA" 310 as the password.

If the entered username 304 and the entered password 306 authorize the user 112 to execute the commands of the script 110 on the server 102, then commands included in the script 110 are sent one by one to the server 102 for execution on the server 102. When the script 110 completes execution the command line user interface 108 may display "script is done!" 312 which is the result of the execution of the last command of the script 110. At a later time, the user 112 may request to see the logfile associated with the execution of the script 110 by entering an exemplary command "cat logfile" 314 on the command line user interface 108. Exemplary responses 316 corresponding to the responses 200 may be displayed on the command line user interface 108. The exemplary responses 316 may indicate the time when the user 112 authenticated with the server 102, the time when the command "other-command1" was executed at the server 102 and the action taken at the server 102, the time when the command "other-command2" failed to execute at the server 102, and the time when the user 112 was logged off the server 102, etc. In alternative implementations, the logfile may be absent and the exemplary responses 316 may be interspersed with commands entered by the user 112 on the command line user interface 108. Furthermore, certain implementations may log errors but avoid logging any non-error activity.

The exemplary interactions 300 shown in FIG. 3 are illustrative. Alternatively, the user 112 may manually enter each command of the script 110 on the command line user interface 108 one by one.

Figure 4:
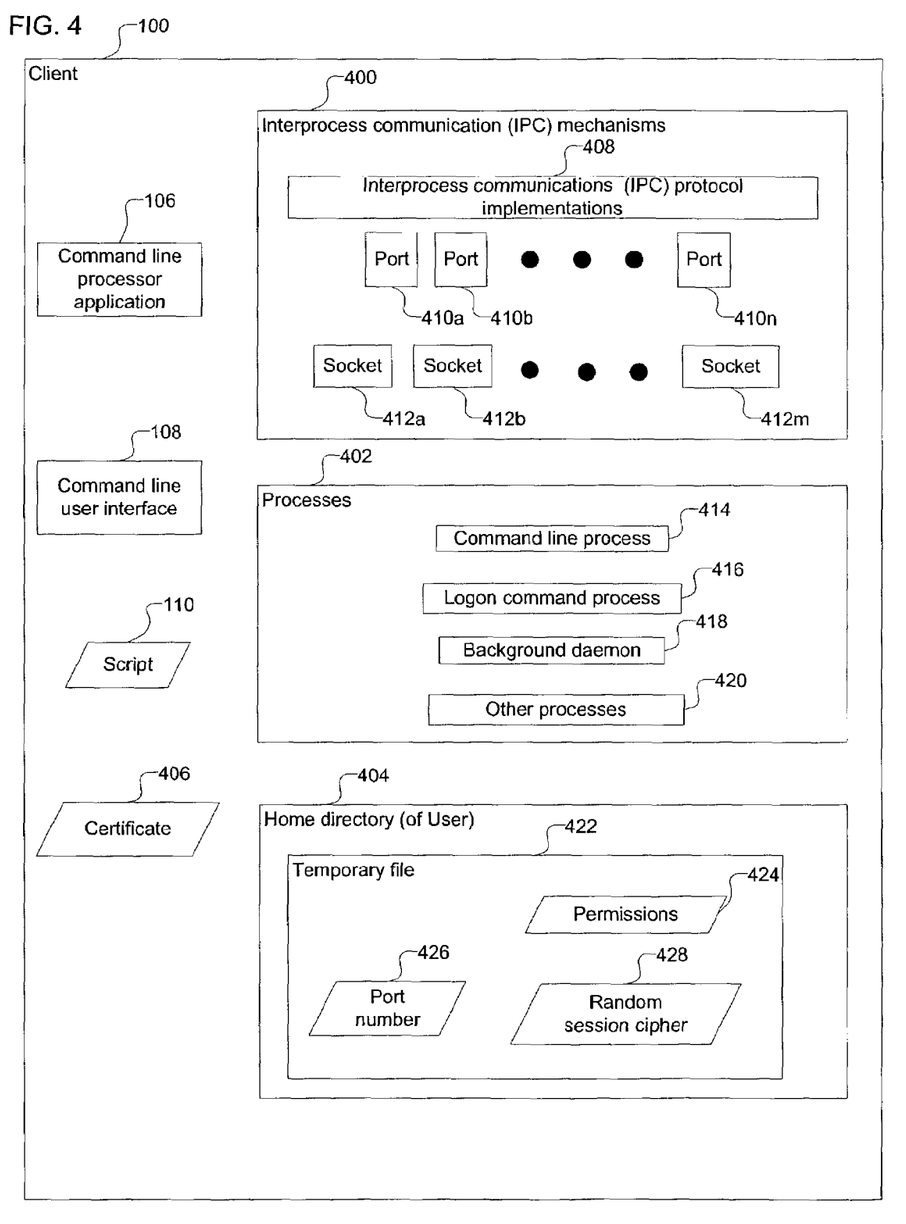
FIG. 4 illustrates a block diagram of a client, in accordance with certain described implementations of the invention.

FIG. 4 illustrates a block diagram of the client 100, in accordance with certain described implementations of the invention. In addition to the command line processor application 106, the command line user interface 108 and the script 110, the client 100 may include interprocess communications (IPC) mechanisms 400, a plurality of processes 402, a home directory 404 for the user 112, and a certificate 406.

The IPC mechanisms 400 include IPC protocol implementations 408, a sequence of ports 410a . . . 410n, and one or more sockets, such as, sockets 412a . . . 412m. IPC protocol is a capability supported by some operating systems that allow one process to communicate with another process. The IPC protocol implementations 408 implement the IPC protocol in the client 100. The ports 410a . . . 410n are used for sending and receiving messages with the IPC protocol. Each port 410a . . . 410n has a different port number. Sockets are the end points of communication in processes, and the sockets 412a . . . 412m are software objects that connect processes in the client 100 to the IPC protocol. Messages are sent to socket addresses in interprocess communications, where interprocess communication comprises of an exchange of some information by transmitting the information in a message between a socket in one process and a socket in another process.

The processes 402 include a command line process 414, a logon command process 416, a background daemon 418, and other processes 420. The command line process 414 is created when the command line processor application 106 executes on the client 100. The logon command process 416 is a process that asks for the username 304 and the password 306, and subsequently processes the entered username 304 and the entered password 308. The logon command process 416 may also start the background daemon 418 process. The background daemon 418 is a process that runs in the background and provides network connectivity between the client 100 and the server 102. Other processes 420 may include processes generated by the execution of commands included in the script 110, or processes started by users who are different from user 112.

The home directory 404 of user 112 is a directory in the file system of the client 100. The home directory 400 may include a temporary file 422 that may be deleted when the temporary file 422 is no longer required. A permissions 424 field that indicates that only user 112 can read or write to the temporary file 422 is coupled to the temporary file 422. The temporary file 422 may record within the temporary file 422 a port number 426 and a random session cipher 428, where the port number 426 and the random session cipher 418 are generated by a process executing in the client 100.

The certificate 406 is any certificate known in the art, such as, a certificate based on Public Key cryptography, that may be used for secure encrypted communications between the client 100 and the server 102.

Therefore, FIG. 4 illustrates the IPC mechanisms 400, the processes 402 and the contents of the home directory 404 included in the client 100.

Figure 5:
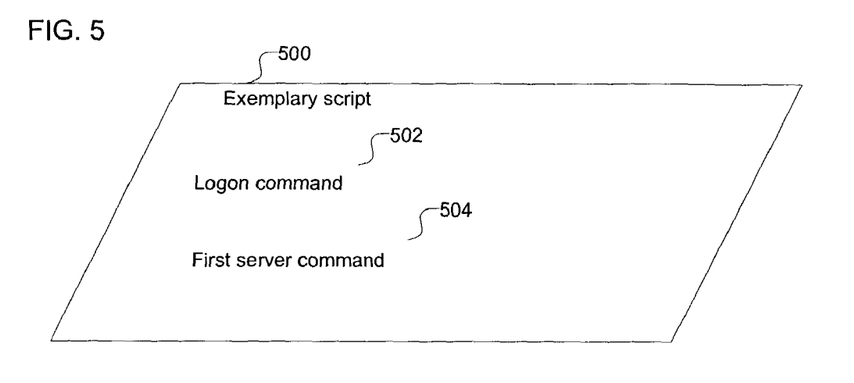
FIG. 5 illustrates a block diagram of an exemplary script, in accordance with certain described implementations of the invention.

FIG. 5 illustrates a block diagram of an exemplary script 500 implemented in the client 100, in accordance with certain described implementations of the invention. The exemplary script 500 is an example of the script 110.

The exemplary script 500 includes two commands: a logon command 502, and a first server command 504. The user 112 executes the script 500 on the command line user interface 108. The scripting language interpreter 111 reads the script 500 and executes each line of the script 500. The login command 502 is processed by the command line processor application 106 which requests the username 304 and the password 306 from the user 112. In certain implementations, the username 304 may be stored in the script 500 and only the password may be requested from the user 112.

Subsequent to the execution of the logon command 502, the command line processor application 106 sends the first server command 504 to the server 102, and the first server command 504 is executed at the server 102. For example, the first server command 504 may be a command to get the time at the server 102. If there are additional commands in the script 500 after the first server command 504 the command line processor application 106 may send the additional commands for execution at the server 102. The last command of the script 500 may be a logoff command (not shown) that automatically terminates a session established with the server 102, where the session may have been established for executing the commands included in the script 500.

In certain implementations, the commands included within the exemplary script 500 may include conditions such that the execution of a subsequent command is dependent on the result of the execution of a previous command. The command line processor application 106 sends commands one by one to the server side application 114. The server side application 114 may send a response 200 to the command line processor application 106 when a command of the exemplary script 500 is sent for execution to the server 102. Subsequent commands of the exemplary script 500 may be processed by the command line processor application 106 based on the response 200 from the server side application 114.

Therefore, FIG. 5 illustrates an exemplary script 500 whose commands are sent from the client 100 to the server 102 for execution.

Figure 6:
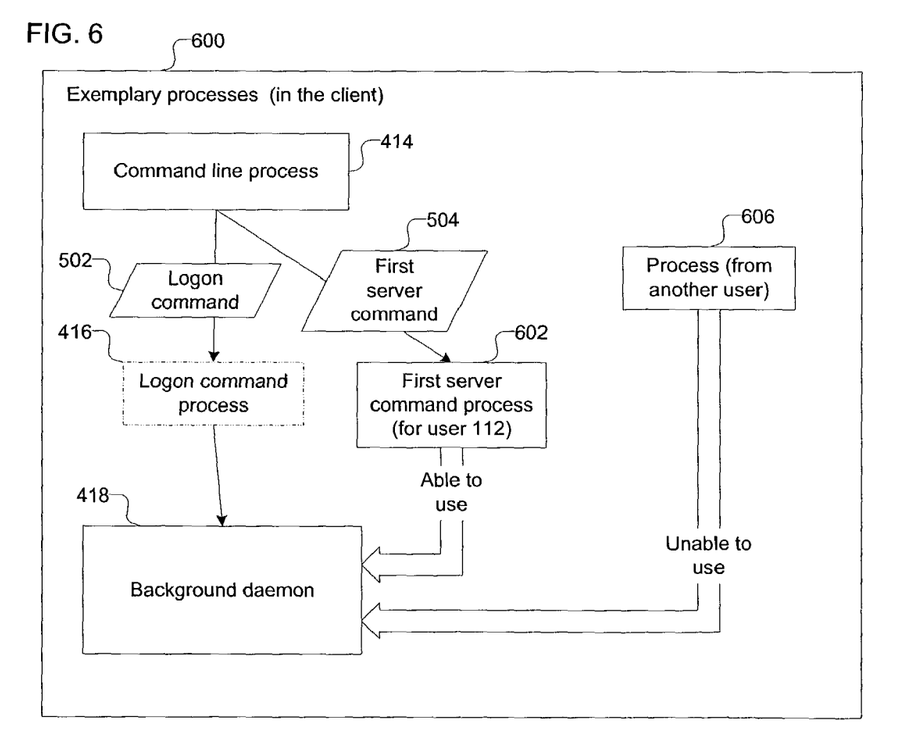
FIG. 6 illustrates a block diagram of exemplary processes in a client, in accordance with certain described implementations of the invention.

FIG. 6 illustrates a block diagram of exemplary processes 500 in the client 100, in accordance with certain described implementations of the invention. When the user 112 requests the execution of the exemplary script 500 in the command line user interface 108, the exemplary script 500 is executed by the command line process 414, where the command line process 414 is a running instance of the command line processor application 106.

The command line process 414 first processes the logon command 502 of the exemplary script 500 by creating the logon command process 416, where the logon command process 416 is a child process of the command line process 414. The logon command process 416 requests the username 304 and password 306 from the user 112. If the username 304 and password 306 entered by the user 112 are valid, then the logon command process 416 creates the background daemon 418 that establishes communications between the client 100 and the server 102. After creating the background daemon 418, the logon command process 416 terminates. The command line process 414 then processes the first server command 504 and creates a first server command process 602.

The implementations allow the first server command process 504 to use the background daemon 418 to send the first server command 504 to the server 102 for execution. The implementations protect a process, such as, the background daemon 418, from being used by any other process that was not created for the user 112, where in the IPC protocol any such process (e.g., the background daemon 418) may be accessible to all other processes. For example, a process from a second user 606 is unable to use the background daemon 418.

Therefore, FIG. 6 illustrates how the background daemon 418 shielded from access by unauthorized processes.

Figure 7:
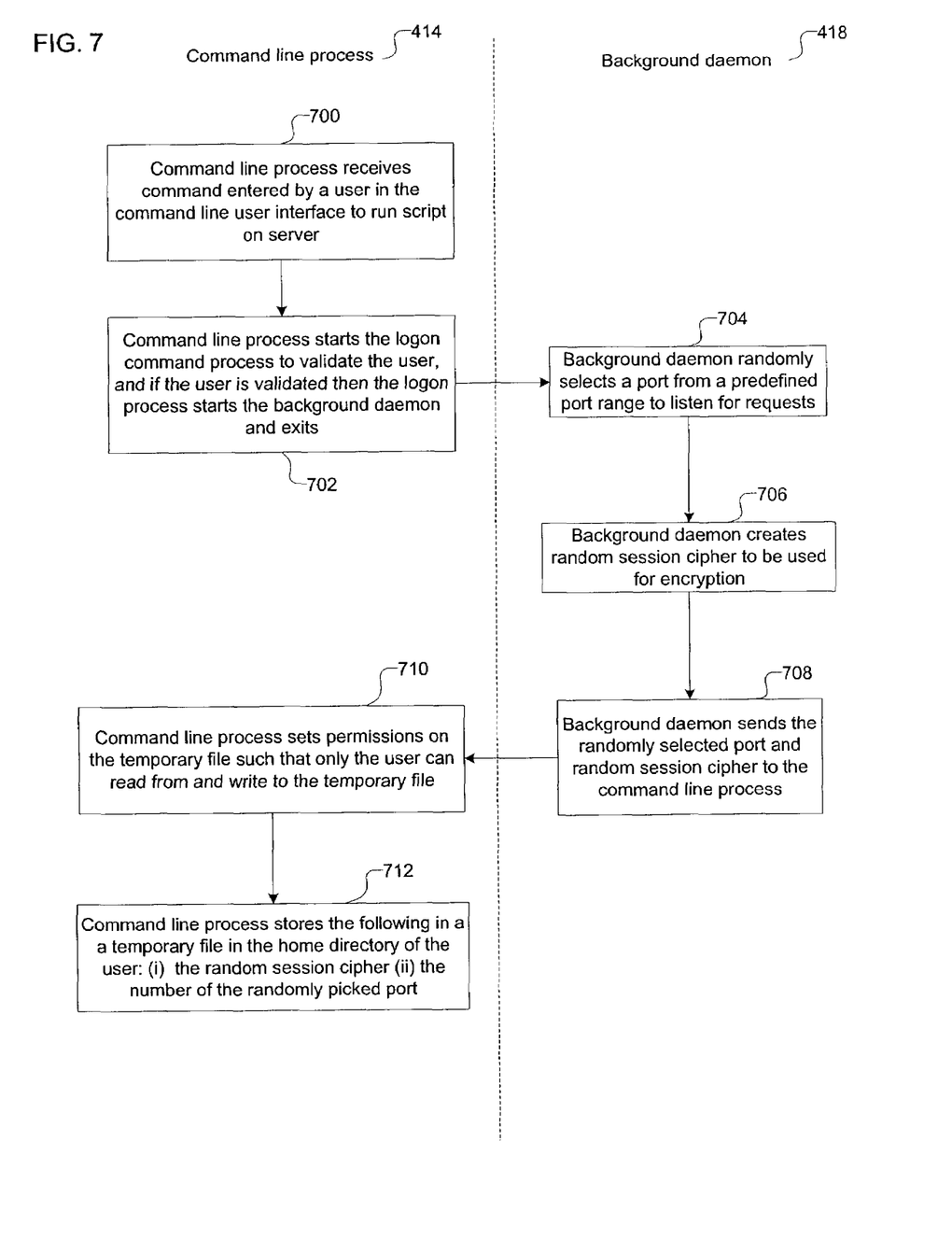
FIG. 7 illustrates logic for setting up a security mechanism for remote script execution, in accordance with certain described implementations of the invention.

FIG. 7 illustrates logic for setting up a security mechanism for remote script execution, in accordance with certain described implementations of the invention. The logic of FIG. 7 is implemented in the command line processor application 106.

The process starts at block 700 where the executing command line processor application 106, i.e., the command line process 414, receives a command entered by the user 112 in the command line user interface 108 to execute one by one the commands included in the script 110 at the server 102. In certain alternative implementations, the script 110 may be scheduled to run automatically at some predetermined time and the user 112 may not have to enter a command to run the script in the command line user interface 108. The executing command line processor application 106 is the command line process 414.

Control proceeds to block 702, where the command line process 414 starts the logon command process 416 to validate the user 112. If the user 112 is validated then the logon command process 416 starts the background daemon 418, where the background daemon 418 controls communications between the client 100 and the server 102. The logon command process 416 terminates after starting the background daemon 418.

Control proceeds to block 704, where the background daemon 418 randomly selects a port from the plurality of ports 410a . . . 410n and listens to requests arriving on the randomly selected port. At block 708, the background daemon 418 creates a random session cipher 428 to be used for encryption, where the random session cipher 428 is any encryption code that may be used to encrypt data in a manner known in the art. The background daemon 418 sends the randomly selected port and the random session cipher 428 to the command line process 414.

At block 710, the command line process 414 sets permissions on the temporary file 422 such that only the user 112 can read from and write to the temporary file 422. Control proceeds to block 712, where the command line process 414 stores the random session cipher 428 and the port number 426 of the randomly selected port in the temporary file 422 of the home directory 404 of the user 112. This concludes the phase for setting up the security mechanism for remote script execution.

If communications to the background daemon 418 are encrypted with the random session cipher 428 then the background daemon 418 can decrypt the encrypted communications. Since permissions on the temporary file 422 are set such that only the user 112 can read from and write to the temporary file 422, the random session cipher 428 is not accessible to processes created by entities other than the user 112. If the random session cipher 428 were absent, then the background daemon could be used via the IPC protocol by processes that are not associated with user 112, such as, the process 606.

Figure 8:
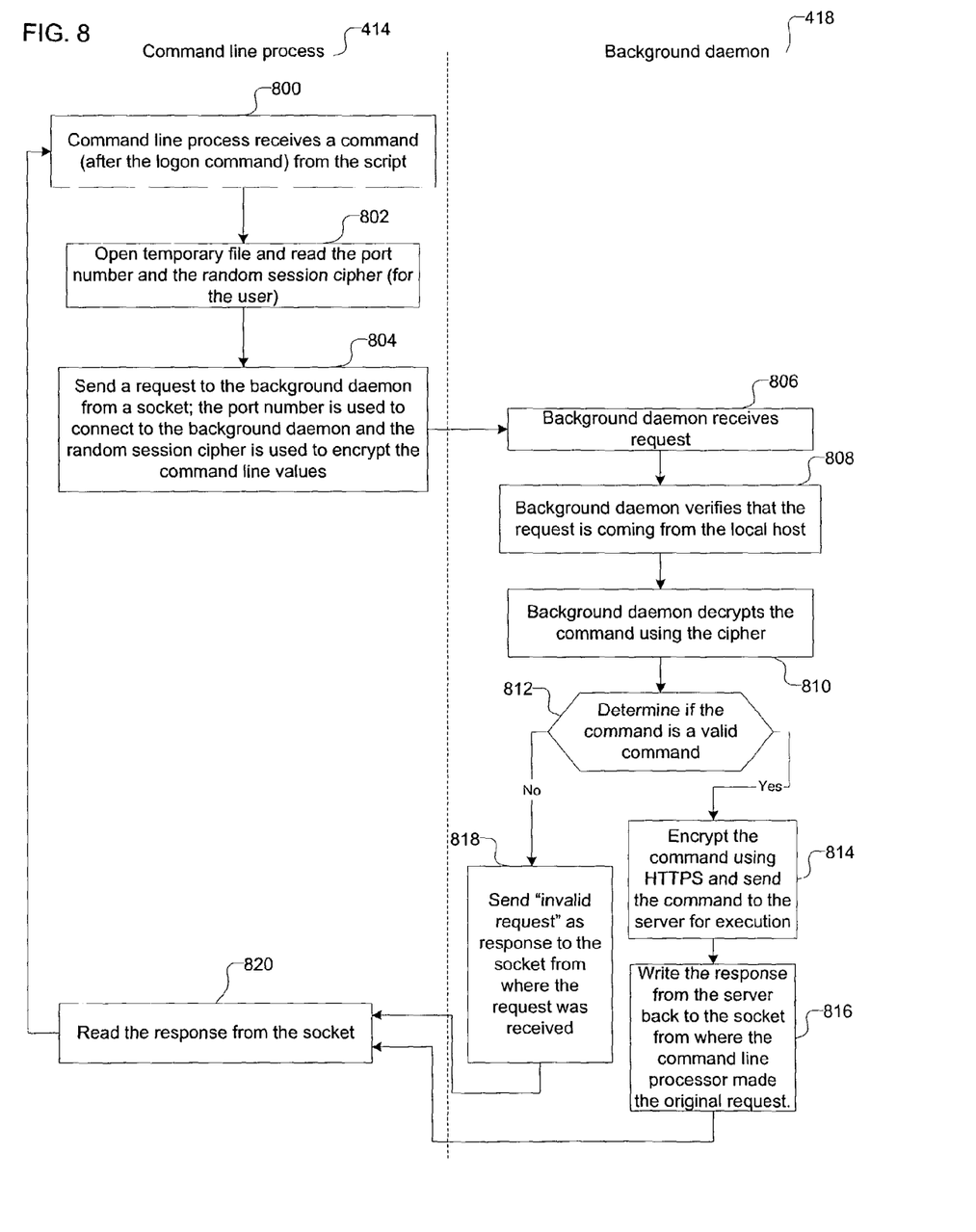
FIG. 8 illustrates logic for remote script execution, in accordance with certain described implementations of the invention.

FIG. 8 illustrates logic for remote script execution, in accordance with certain described implementations of the invention. The logic of FIG. 8 is implemented in the command line processor application 106.

The process starts at block 800 where the command line process 414 receives a command after the logon command 502 has executed in the script 110. Control proceeds to block 802 where the command line process 414 opens the temporary file 422 and reads the port number 426 and the random session cipher 428.

Control proceeds to block 804, where the command line process 414 sends a request to the background daemon 414 from a socket selected from the plurality of sockets 412*a* . . . 412*m*. The port number 426 is used to connect to the background daemon 418 and the random session cipher 428 is used to encrypt the request that includes the received command from the script 110.

Control proceeds to block 806 where the background daemon 418 receives the request. The background daemon 418 verifies (at block 808) that the request is coming from the local host, i.e., the client 100, and proceeds to decrypt (at block 810) the received command by using the random session cipher 428 that was originally generated by the background daemon 418.

Control proceeds to block 812 where the background daemon 418 determines whether the decrypted command is a valid command. If so, control proceeds to block 814 where the background domain 418 encrypts the valid command under the HTTPS protocol and sends the encrypted command to the server 102 for execution. Control proceeds to block 816, where the background daemon 418 writes the response 200 received from the server 102 back to the socket from where the command line process 414 made the request to the background daemon 418.

If at block 812, the background daemon 418 determines that the decrypted command is not a valid command, then control proceeds to block 818. If the request received by the background daemon 418 had been from an unauthorized process then the decryption by the background daemon 418 would lead to an invalid command as the unauthorized process would not have access to the random session cipher 428. At block 818, the background daemon 418 sends a response indicating that the request is invalid to the socket from where the request was received at the background daemon 418.

From either block 816 or block 818 control proceeds to block 820 where the command line process 414 reads the response from the socket. Control may return to block 800, where the command line process 818 may receive a next command from the script 110.

Therefore, the logic of FIG. 8 illustrates how the background daemon 418 determines that requests received by the background daemon 418 are from authorized processes.

The implementations provide a scripting client where a user has to login only once for remote execution of a series of commands on the remote device. Additionally, the implementations prevent the network session created between the client and the remote device by a user from being used by any other process on the client. The implementations support any scripting language known in the art. The scripting language may be selected by the user 112 at the client 100. Support for the scripting language is not required at the server 102 because the client 100 sends only one command of a script at a time to the server 102 and script interpretation is performed at the client 100.

The user 112 requires physical access only to the client 100, and does not require any physical access to the server. Furthermore, the user 112 does not need to remotely configure any specialized software on the server 102. Additionally, the implementations allow interdependent commands to be included in the script 110. Furthermore, while the implementations have been described with reference to the execution of a script on a remote server, aspects of the implementations may be implemented in other environments.

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as, magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code for the implementations may further be accessible through a transmission media or from a file server over a network. In such cases, the article of manufacture in which the code is implemented may comprise a transmission media, such as, a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Figure 9:
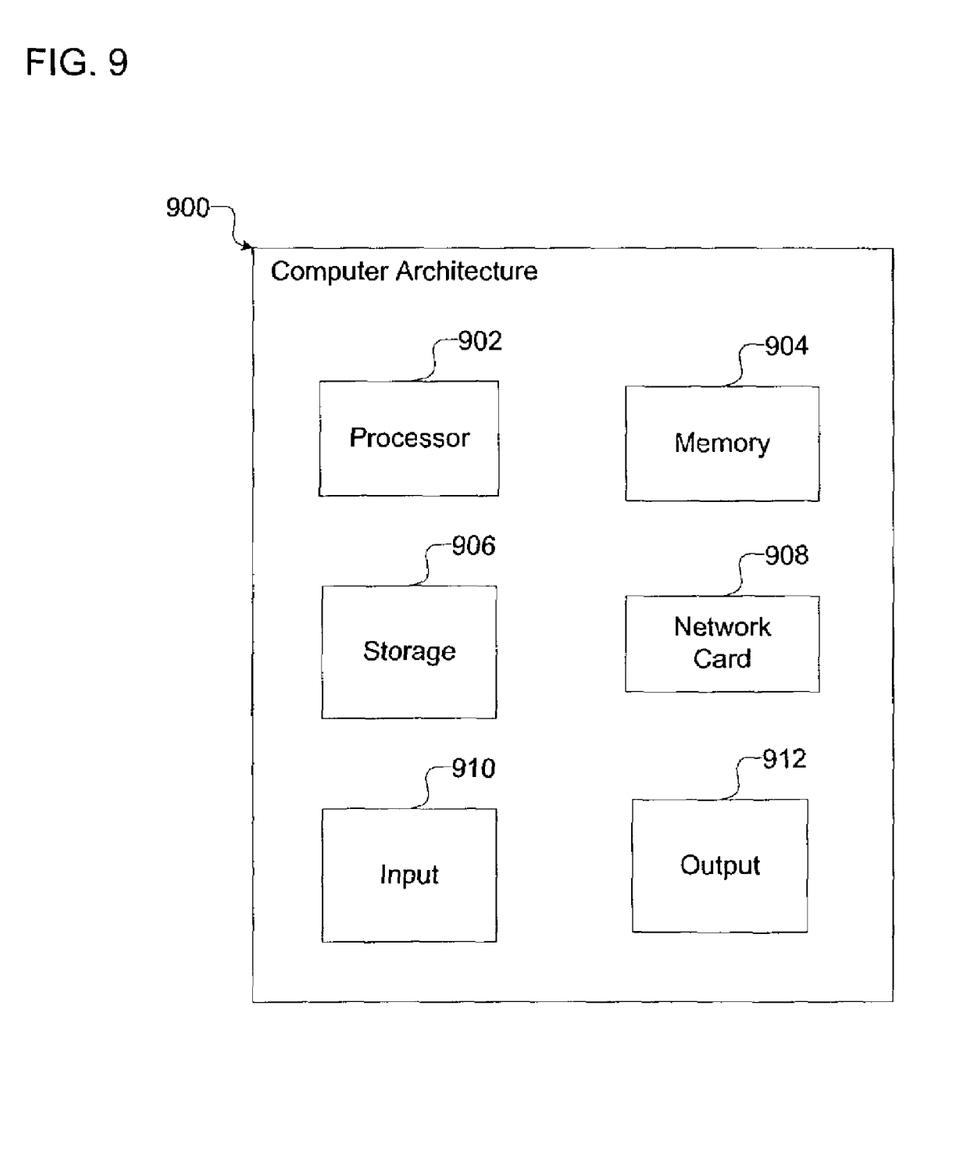
FIG. 9 illustrates a block diagram of a computer architecture in which certain described aspects of the invention are implemented.

FIG. 9 illustrates a block diagram of a computer architecture in which certain aspects of the invention are implemented. FIG. 9 illustrates one implementation of the client 100 and the server 102. The client 100 and the server 102 may implement a computer architecture 900 having a processor 902, a memory 904 (e.g., a volatile memory device), and storage 906 (e.g., a non-volatile storage, magnetic disk drives, optical disk drives, tape drives, etc.). The storage 906 may comprise an internal storage device, an attached storage device or a network accessible storage device. Programs in the storage 906 may be loaded into the memory 904 and executed by the processor 902 in a manner known in the art. The architecture may further include a network card 908 to enable communication with a network. The architecture may also include at least one input 910, such as, a keyboard, a touchscreen, a pen, voice-activated input, etc., and at least one output 912, such as, a display device, a speaker, a printer, etc.

The logic of FIG. 7 and FIG. 8 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

The data structures, applications, agents, and components show in FIGS. 1-9 are shown as having specific types of information. In alternative implementations, the data structures, agents, and components may be structured differently and have fewer, more or different fields, components or functions than shown in the figures.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for remotely managing devices, comprising:
   creating, by a first process, a second process, the first process and second process generated by an application executing on a client;
   generating a cipher at the client by one of the first process or the second process, the generated cipher stored in a temporary file along with information related to accessing the generated cipher;
   terminating the first process upon creating the second process; and
   controlling access to the generated cipher in the temporary file, the temporary file being deleted upon completion of the application executing on the client;
   wherein the second process communicates with other processes via an interprocess communication mechanism using the generated cipher, wherein the interprocess communication mechanism allows the second process to be accessed by other processes based on access information to the generated cipher in the temporary file, the method further including,
   selecting a scripting language;
   determining a first command in a script written in the scripting language; and
   establishing a network session connecting the client and a server with the second process, wherein the first process is created by executing the first command at the client.

2. The method of claim 1, further comprising:
   authorizing only processes that are permitted to read the generated cipher to access the second process.

3. The method of claim 1, further comprising:
   storing the cipher;
   allowing access to the stored cipher to a third process; and
   encrypting, with the stored cipher, a message from the third process to the second process.

4. The method of claim 1, wherein the authorization further comprises:
   receiving a message at the second process from a third process;
   decrypting the received message with the cipher;
   determining if the decrypted message is valid;
   if the decrypted message is valid, then allowing the third process to access the second process; and
   if the decrypted message is invalid, then preventing the third process from accessing the second process.

5. The method of claim 1, wherein the second process further performs:
   establishing a network session between the client and the server; sending a command, via the network session, from the client to the server; and
   receiving a response from the server, based on the execution of the command at the server.

6. The method of claim 1, wherein the creation, generation, termination and authorization are performed by an application that sends a series of commands for execution on a remote device, and wherein the cipher is generated by the first process or the second process.

7. An article of manufacture for remotely managing devices, wherein the article of manufacture is capable of causing operations, the operations comprising:
   creating, by a first process, a second process, and the second process communicates with other processes via an interprocess communication mechanism, such that the interprocess communication mechanism allows the second process to be accessed by other processes, the first process and second process generated by an application executing on a client;
   generating a cipher at the client by one of the first process or the second process, the generated cipher stored in a temporary file along with information related to accessing the generated cipher;
   terminating the first process upon creating the second process;
   controlling access to the generated cipher in the temporary file;
   authorizing only processes that are permitted to read the generated cipher to access the second process, allowing access to the generated cipher to a third process based on the access information, and encrypting with the stored cipher a message from the third process to the second process; and wherein the authorization further includes, receiving a message at the second process from third process;

decrypting the received message with the generated cipher;

determining if the decrypted message is valid;

if the decrypted message is valid, then allowing the third process to access the second process; and if the decrypted message is invalid, then preventing the third process from accessing the second process;

wherein the temporary file storing the generated cipher is deleted upon completion of the application.

8. The article of manufacture of claim 7, wherein the first process and the second process are generated by an application executing on a client, the operations further comprising:

selecting a scripting language;

determining a first command in a script written in the scripting language; and establishing a network session connecting the client and a server with the second process, wherein the first process is created by executing the first command at the client.

9. The article of manufacture of claim 7, wherein the second process further performs:

establishing a network session between a client and a server;

sending a command, via the network session, from the client to the server; and receiving a response from the server, based on the execution of the command at the server.

10. The article of manufacture of claim 7, wherein the creation, generation, termination and authorization are performed by an application that sends a series of commands for execution on a remote device, and wherein the cipher is generated by the first process or the second process.

* * * * *